(12) United States Patent
Auberger et al.

(10) Patent No.: US 11,554,681 B2
(45) Date of Patent: Jan. 17, 2023

(54) METHOD FOR OPERATING AN ELECTRIC VEHICLE AND CONTROL DEVICE FOR AN ELECTRIC VEHICLE

(71) Applicant: AUDI AG, Ingolstadt (DE)

(72) Inventors: Florian Auberger, Koesching (DE); Samy Behrooz, Manching (DE)

(73) Assignee: AUDI AG, Ingolstadt (DE)

( * ) Notice: Subject to any disclaimer, the term of this patent is extended or adjusted under 35 U.S.C. 154(b) by 121 days.

(21) Appl. No.: 16/637,002

(22) PCT Filed: Aug. 1, 2018

(86) PCT No.: PCT/EP2018/070871
§ 371 (c)(1),
(2) Date: Feb. 6, 2020

(87) PCT Pub. No.: WO2019/042693
PCT Pub. Date: Mar. 7, 2019

(65) Prior Publication Data
US 2020/0164757 A1    May 28, 2020

(30) Foreign Application Priority Data
Aug. 29, 2017    (DE) .................. 10 2017 215 075.0

(51) Int. Cl.
*B60L 53/35*    (2019.01)
*B60L 53/30*    (2019.01)
(Continued)

(52) U.S. Cl.
CPC ............ *B60L 53/35* (2019.02); *B60L 53/16* (2019.02); *B60L 53/18* (2019.02); *B60L 53/305* (2019.02);
(Continued)

(58) Field of Classification Search
CPC ........ B60L 53/35; B60L 53/305; B60L 53/16; B60L 53/18; B60L 2240/622; B60L 2240/625; B60L 2240/627
See application file for complete search history.

(56) References Cited

U.S. PATENT DOCUMENTS

2008/0039979 A1*  2/2008  Bridges ................. B60L 55/00
                                                   700/286
2009/0024267 A1*  1/2009  Kawai .................. B60L 53/305
                                                   903/902
(Continued)

FOREIGN PATENT DOCUMENTS

CN          105313717 A      2/2016
DE    10 2009 016 504 A1     4/2011
(Continued)

OTHER PUBLICATIONS

English-language translation of International Preliminary Report on Patentability dated Mar. 12, 2020, in corresponding International Application No. PCT/EP2018/070871; 6 pages.
(Continued)

*Primary Examiner* — David V Henze-Gongola
(74) *Attorney, Agent, or Firm* — Maier & Maier, PLLC

(57) ABSTRACT

A method for operating an electric vehicle, in which an automatic unlocking function for a vehicle-side charging interface is activated if it is established on the basis of an ascertained position of the electric vehicle that the electric vehicle is arranged at a public charging column. The activated automatic unlocking function effectuates automatic unlocking of the charging interface as soon as a charging procedure of the electric vehicle is ended and thus a charging cable connected to the vehicle-side charging inter-face is released. The invention furthermore relates to a control device for an electric vehicle.

14 Claims, 1 Drawing Sheet

(51) Int. Cl.
*B60L 53/16* (2019.01)
*B60L 53/18* (2019.01)

(52) U.S. Cl.
CPC ... *B60L 2240/622* (2013.01); *B60L 2240/625* (2013.01); *B60L 2240/627* (2013.01)

(56) References Cited

U.S. PATENT DOCUMENTS

| | | | |
|---|---|---|---|
| 2012/0071017 A1 | 3/2012 | Gaul et al. | |
| 2013/0204473 A1 | 8/2013 | Then et al. | |
| 2013/0342164 A1* | 12/2013 | Choi | B60L 53/14 320/109 |
| 2014/0167695 A1* | 6/2014 | Shimizu | B60L 53/65 320/109 |
| 2014/0179141 A1* | 6/2014 | Kojima | B60L 53/65 439/296 |
| 2015/0035478 A1* | 2/2015 | Uchiyama | B60L 1/003 320/107 |
| 2015/0329002 A1 | 11/2015 | Broecker et al. | |
| 2015/0345962 A1* | 12/2015 | Graham | G01C 21/3492 701/430 |
| 2017/0217403 A1* | 8/2017 | Kim | B60R 25/104 |

FOREIGN PATENT DOCUMENTS

| | | |
|---|---|---|
| DE | 10 2010 009 715 A1 | 9/2011 |
| DE | 20 2013 008 919 U1 | 12/2013 |
| DE | 10 2014 209 210 A1 | 11/2015 |
| EP | 2 826 660 A1 | 1/2015 |
| JP | 2012050220 A | 3/2012 |
| WO | 2013152376 A2 | 10/2013 |

OTHER PUBLICATIONS

Examination Report dated Mar. 1, 2019 in corresponding German application No. 10 2017 215 075.0; 16 pages including Machine-generated English-language translation.

International Search Report and Written Opinion of the International Searching Authority dated Oct. 18, 2018 in corresponding International application No. PCT/EP2018/070871; 24 pages including Partial/Human-generated/Machine-generated English-language translation.

Office Action dated Sep. 27, 2022, in connection with Chinese Patent Application No. 201880056718.9 (16 pp., including English translation).

* cited by examiner

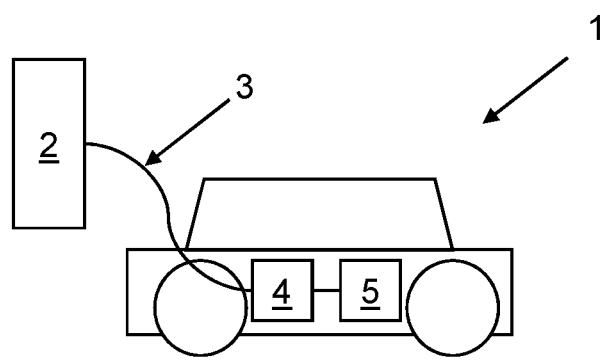

METHOD FOR OPERATING AN ELECTRIC VEHICLE AND CONTROL DEVICE FOR AN ELECTRIC VEHICLE

FIELD

The disclosure relates to a method for operating an electric vehicle and a control device for an electric vehicle.

Background

As a type of service provision, charging columns for the free charging of electric vehicles are being provided more and more frequently in the public sphere, for example, in the vicinity of shopping centers, at workplaces, or the like. It can certainly occur in this case that multiple parking spaces are available around each charging column. If one person now connects their electric vehicle to the charging column for charging and subsequently goes shopping, for example, for a long time, other persons thus cannot use the charging column to charge their own electric vehicles, even if the charging procedure should already be ended at the other electric vehicle. Other persons are thus prevented from charging their own electric vehicles during the entire parking time period of the other vehicle, although the plugged-in external vehicle at the charging column is already completely charged.

DE 10 2010 009 715 A1 discloses a method for charging a battery of a motor vehicle. In this case, unlocking of the charging plug is performed upon the detection of a vehicle owner in the vicinity of the relevant motor vehicle.

DE 10 2014 209 210 A1 discloses a method for controlling a locking device of an electrical charging connector of a vehicle. Unlocking of the charging connector is only performed when a user is located within a defined distance to the vehicle.

DE 10 2009 016 504 A1 discloses a method for unlocking a charging cable. Unlocking of the charging cable is performed in dependence on an unlocking signal of a vehicle key, by means of which the vehicle as such can be locked and unlocked.

SUMMARY

It is the object of the present invention to provide a method for operating an electric vehicle and a control device for an electric vehicle, by means of which a charging cable connected to the electric vehicle can be unlocked in a manner adapted to the situation.

This object is achieved by a method for operating an electric vehicle and by a control device for an electric vehicle.

In the method according to the invention for operating an electric vehicle, an automatic unlocking function for a vehicle-side charging interface is activated when it is established on the basis of an ascertained position of the electric vehicle that the electric vehicle is arranged at a public charging column, wherein the activated automatic unlocking function effectuates automatic unlocking of the charging interface as soon as a charging procedure of the electric vehicle is ended and thus a charging cable connected to the vehicle-side charging interface is released.

It is thus provided according to the invention that the automatic unlocking function is activated in a geographically related manner. In consideration of the present position of the electric vehicle, it is ascertained whether the electric vehicle is arranged at a public charging column, i.e., in the region of a public charging column, or not. If the electric vehicle should be arranged in the region of a public charging column, the automatic unlocking function is automatically activated. Arranged in the region of a public charging column is to be understood in particular to mean that the electric vehicle is arranged sufficiently close to the charging column that a charging cable of the charging column can be connected to the charging interface of the electric vehicle.

Without action of a user of the electric vehicle, in the case in which the electric vehicle is arranged in the region of a public charging column, automatic unlocking of the charging interface is thus effectuated as soon as a charging procedure of the electric vehicle is ended and other persons are thus given the option of themselves using the charging column for charging their electric vehicles. Because of the automatic unlocking function, the vehicle-side charging interface is unlocked, so that a charging cable connected to the vehicle-side charging interface is released and other persons can remove the charging cable, for example, very easily from the vehicle-side charging interface and can connect it to a vehicle-side charging interface of their electric vehicle.

In the method according to the invention, it is not necessary at all for the electric vehicle itself to be able to detect what type of charging infrastructure it is arranged at and/or connected to, i.e., a public charging column or a private charging column. This is also not necessary at all, since it can be automatically decided or determined in consideration of the position of the electric vehicle whether the relevant electric vehicle is presently arranged at a public charging column or not. For example, digital map material can be provided and stored in the vehicle, in which various public charging columns are saved in the form of points of interest or the like. It can be determined in a simple manner by a comparison of the present position of the electric vehicle to this digital map material whether the electric vehicle is presently arranged at a public charging column or not.

If a user of the electric vehicle should have parked it, for example, in their own garage or on their courtyard entrance, it is thus automatically recognized that the electric vehicle is presently not arranged at a public charging column. As a result, the automatic unlocking function is also not activated. Or if the driver of the electric vehicle should presently have parked it, for example, on vacation somewhere in the vicinity of a vacation home or, for example, in an underground hotel garage and in this case should have connected to a charging column using their own mobile charging cable, there is no risk that the automatic unlocking function will be activated. The mobile charging cable thus cannot be removed from the vehicle-side charging interface even after ending of the charging procedure of the electric vehicle without the user of the electric vehicle manually ensuring, for example, corresponding unlocking.

The risk of theft of one's own charging equipment can thus be substantially reduced. The automatic unlocking function is thus activated as needed without action of a user of the electric vehicle only when this is also reasonable, namely when the electric vehicle is arranged in the vicinity of a public charging column.

One advantageous embodiment of the invention provides that the automatic unlocking function remains deactivated if it is established on the basis of the ascertained position of the electric vehicle that the electric vehicle is not arranged at a public charging column. It can be ensured by the geographically related automatic activation or deactivation, respectively, of the automatic unlocking function that the automatic unlocking function is only activated or deactivated, respectively, at appropriate locations.

A further advantageous embodiment of the invention provides that the position of the electric vehicle is ascertained on the basis of GPS-based, mobile-wireless-network-based, and/or WLAN-based locating. If the electric vehicle is equipped, for example, with a navigation system, this system thus typically has a GPS module in any case. It is thus possible in a simple manner to determine the position of the electric vehicle. Satellite-signal-based locating is very generally preferably provided. In modern vehicles, it is moreover typical for these vehicles to have a SIM card integrated for an automatic emergency call function. In this case, it is also possible in a simple manner based on the mobile wireless network, for example, by establishing in the region of which mobile wireless cell one is presently logged in, to determine the position of the electric vehicle. Furthermore, modern vehicles frequently also have the option of connecting themselves to a WLAN and/or therefore also detecting various WLAN access points. In this case, it is also very easily possible to perform WLAN-based locating. In particular if the various options are combined, it is possible to determine the position of the electric vehicle in a particularly exact and failsafe manner, since the different locating variations function differently well in the case of different boundary conditions, for example, in the open air, in underground garages, etc.

Alternatively or additionally, it is also possible that the driving behavior of various users of the electric vehicle is continuously detected and analyzed. Thus, for example, knowledge about the course of the day of the user can be obtained, so that it can be determined in awareness of these behaviors whether the electric vehicle is arranged in the vicinity of a public charging column. If the owner of an electric vehicle typically always drives, for example, on workdays in the morning at a specific time of day to work and parks their vehicle at work at a public charging column, it can thus be presumed relatively reliably on a workday in the range of typical work times that the electric vehicle is also arranged at a public charging column. It is also possible to ascertain a position of the electric vehicle via such a procedure. Furthermore, it is alternatively or additionally also possible that, for example, an electronic calendar of a user of the electric vehicle is accessed, so that it can be ascertained or estimated relatively reliably in awareness of specific entered appointments where the electric vehicle has presently been parked. In awareness of these items of information, it can also be determined and/or estimated whether the electric vehicle is presently arranged in the region of a public charging column or not.

In a further advantageous embodiment of the invention, it is provided that the automatic unlocking function is only activated if it has been released by a user. The release is preferably enabled and detected by means of a vehicle-side user interface or by means of a user interface of a mobile terminal. The user can thus decide themselves whether the automatic unlocking function is actually also supposed to be activated when they have arranged their electric vehicle at a public charging column. They can thus determine themselves whether they wish to use this functionality or not. For example, they can input this via a touchscreen in the vehicle interior. Alternatively or additionally, it is also possible that they can actuate a corresponding specification on their smart phone, wherein data and/or items of information in this regard can be transmitted to a corresponding control unit of the electric vehicle.

A further advantageous embodiment of the invention provides that an operation of at least one consumer of the electric vehicle is restricted in the case of parked electric vehicle if the automatic unlocking function is activated. Preferably, an operation of a remote-actuatable and/or timer-based stationary climate control, for example, stationary ventilation, stationary heating, or also stationary cooling, of the electric vehicle is restricted or prevented. If the user of the electric vehicle should approach a public charging column, for example, park their electric vehicle there, and connect their electric vehicle to the public charging column for charging and also desire at the same time that, for example, from a specific point in time, the climate control system of the electric vehicle is activated to cool the vehicle interior, it can be advantageous if the operation of the climate control system is restricted in the case of activated automatic unlocking function. The restriction can simply consist, for example, of the user only being made aware via their smart phone that under certain circumstances the presently charged battery of the electric vehicle will be partially emptied again if this climate control system is remotely actuated. It is also possible as well that the climate control is simply prevented, so that the battery is not discharged. Such a warning, restriction, or also prevention of specific functionalities of the electric vehicle which would consume current can be applied to all consumers of the electric vehicle.

It can thus be ensured that in the case of activated automatic unlocking function, the driver of the motor vehicle is at least made aware that they run the risk that the battery of the electric vehicle will in turn partially be emptied. Depending on the degree of the restriction of such functions, it can also be established that the battery can only be emptied up to a certain degree by corresponding remote-actuatable or timer-based electric consumers of the electric vehicle until this function is interrupted or stopped again, respectively.

The control device according to the invention for an electric vehicle is configured to carry out the method according to the invention or an advantageous embodiment of the method according to the invention. Advantageous designs of the method according to the invention are to be considered to be advantageous designs of the control device according to the invention and vice versa, wherein the control device in particular comprises means for carrying out the method steps.

The electric vehicle according to the invention comprises the control device according to the invention or an advantageous embodiment of the control device according to the invention. In particular, the electric vehicle comprises means for carrying out the above-mentioned method steps.

Further advantages, features, and details of the invention result from the following description of a preferred exemplary embodiment and on the basis of the drawing. The features and feature combinations mentioned above in the description and also the features and feature combinations mentioned hereafter in the description of the FIGURE and/or Solely Shown in the FIGURE are Usable not Only in the Respective Specified combination but rather also alone or in other combinations without leaving the scope of the invention.

BRIEF DESCRIPTION OF THE DRAWING

FIG. 1 shows a schematic illustration of an electric vehicle which is presently connected to a public charging column.

DETAILED DESCRIPTION

An electric vehicle 1, which is connected to a public charging column 2, is shown in a schematic illustration in the single FIGURE. A charging cable 3 of the public charging column 2 has been connected to a vehicle-side charging interface 4 and locked thereto to charge a battery (not identified in greater detail) of the electric vehicle 1. For example, the public charging column 2 can be arranged on a customer parking lot of a shopping center, so that customers can charge their respective electric vehicles 1 at no cost and conveniently at the public charging column 2 during their shopping. It can certainly occur in this case that a battery of the electric vehicle 1 is already fully charged earlier before the relevant user of the electric vehicle 1 returns from their shopping. As long as the charging cable 3 of the public charging column 2 is mechanically locked with the vehicle-side charging interface 4, however, other customers cannot use the public charging column 2.

To counteract such a problem, an automatic unlocking function for the vehicle-side charging interface 4 is automatically activated if it is established on the basis of an ascertained position of the electric vehicle 1 that the electric vehicle 1 is arranged at this or at another public charging column 2. The activated automatic unlocking function effectuates automatic unlocking of the charging interface 4 as soon as a charging procedure of the electric vehicle 1 is ended. The charging cable 3 previously locked with the vehicle-side charging interface 4 is thus released. Other persons who have also parked their electric vehicles in the vicinity of the public charging column 2 can then, for example, remove the charging cable 3 very easily from the vehicle-side charging interface 4 and plug the charging cable 3 into a corresponding charging interface of their own electric vehicle to then charge it.

In this case, it is not even necessary for the user of the electric vehicle 1, which is still connected to the public charging column 2 as shown here, to unlock the locking of the vehicle-side charging interface 4 of their electric vehicle 1 by manual action.

A control device 5 of the electric vehicle 1 assumes the function in this case of detecting the position of the electric vehicle 1 and ascertaining based thereon whether the electric vehicle 1 is presently arranged at the public charging column 2 or at another public charging column. Data which permit inferences about the position of the electric vehicle 1 can be provided, for example, in a GPS-based, mobile-wireless-network-based, and/or WLAN-based manner.

If the electric vehicle 1 comprises, for example, a navigation system, the electric vehicle 1 is thus also equipped in any case with a GPS receiver. This receiver then supplies data, on the basis of which inferences can be made about the position of the electric vehicle 1. Many electric vehicles typically also comprise an integrated SIM card, so that, for example, in case of an emergency, an automatic emergency call can be made. Based on a corresponding communication module and the SIM card it is also possible to perform locating of the electric vehicle 1 based on a mobile wireless network. Moreover, electric vehicles more frequently have the option of connecting themselves to a WLAN, for example, a public hotspot or the like. If such a functionality is implemented in any case in the electric vehicle 1, WLAN-based locating can also be performed. The mentioned procedures for position determination of the electric vehicle 1 can certainly also be carried out in combination. If the electric vehicle 1 is parked, for example, in an underground garage, it can thus be that a public or also a private WLAN hotspot is available. Even if a GPS signal or also a mobile wireless network signal cannot be received, it would nonetheless be possible in this case to perform a position determination of the electric vehicle 1 in a WLAN-based manner.

In addition, the control device 5 can also be configured, for example, to continuously analyze the driving behavior of users of the electric vehicle 1 and to draw inferences based thereon at which time of day the electric vehicle 1 is parked where. In awareness of this parking and/or driving behavior of the user of the electric vehicle 1, inferences can also be drawn about the present position of the electric vehicle 1. Furthermore, it is also possible, for example, that the control device 5 has access to an electronic calendar of a user of the electric vehicle 1, so that it can possibly also be determined on the basis of calendar entries where the electric vehicle 1 has presently been parked with probability bordering on certainty.

Said automatic unlocking function remains deactivated if it is established on the basis of the ascertained position of the electric vehicle 1 that the electric vehicle 1 is not arranged at a public charging column. If the electric vehicle 1 should have been parked, for example, in a private garage of the user of the electric vehicle 1, the automatic unlocking function thus remains deactivated. This is because in such a case it usually does not cause any problems if the electric vehicle 1 remains connected to a private charging option in said garage and an associated charging cable remains locked on the vehicle-side charging interface 4.

It is equally also possible that, for example, it is detected that the electric vehicle 1 has been parked on a hotel parking lot, wherein no charging column classified as public is provided there. Nonetheless, it could be that a charging column is provided there, wherein the user of the electric vehicle 1 has to use their own charging cable to charge the electric vehicle 1. It can then be ascertained on the basis of the position determination of the electric vehicle 1 that it is not arranged at a charging column classified as public, wherein in this case the automatic unlocking function remains deactivated. In such cases, because of the remaining locking of the vehicle-side interface, it is also possible to prevent, after the end of charging of the electric vehicle 1, private charging equipment in the form of charging cables and charging plugs from being stolen.

Furthermore, it is also possible that the automatic unlocking function is only automatically activated if this has been released by a user of the electric vehicle 1. For example, the user of the electric vehicle 1 can establish via a vehicle-side touchscreen in a corresponding menu structure whether they wish for the automatic unlocking function to be used at all or not. Furthermore, it is also possible, for example, that the user of the electric vehicle 1 can establish via a corresponding suitable app on their smart phone whether they wish this automatic unlocking function or not. The user of the electric vehicle 1 can thus determine themselves whether they wish to permit this automatic unlocking function in the vicinity of public charging columns 2 or not.

For example, it could be that the user of the electric vehicle 1 does park at such a public charging column 2 and also connects their electric vehicle 1 thereto, but they know that at some time they will wish an automatic climate control of the vehicle interior of the electric vehicle 1 during a longer shopping trip or the like. In this case, it can be advantageous if the electric vehicle 1 still remains connected to the public charging column 2 even after ending the charging procedure. This is because if a climate control system for the climate control of the vehicle interior of the electric vehicle 1 is operated when electric vehicle 1 is parked, this would otherwise have the result that the battery of the electric vehicle 1 is emptied. In contrast, if the user of the electric vehicle 1 prevents the activation of the automatic unlocking function from the outset, they can thus ensure that even if they have connected their electric vehicle 1 to a public charging column 2, the charging cable 3 cannot be disconnected from the vehicle-side charging interface 4, so that electrical consumers of the electric vehicle 1 can also be operated when electric vehicle 1 is parked, without the battery of the electric vehicle 1 being emptied, by the electrical consumer being powered by the charging column 3.

The invention claimed is:

1. A method for operating an electric vehicle, comprising:
   activating an automatic unlocking function for a vehicle-side charging interface based on an ascertained position of the electric vehicle if the electric vehicle is arranged at a public charging column,
   wherein the activated automatic unlocking function effectuates automatic unlocking of the charging interface as soon as a charging procedure of the electric vehicle is ended and thus a charging cable connected to the vehicle-side charging interface is released,
   wherein the ascertained position of the electric vehicle is estimated based on a historical analysis, the historical analysis comprising a past driving behavior and/or a driving history of at least one user of the electric vehicle,
   wherein an operation of a remotely-actuatable and/or timer-based stationary climate control of the electric vehicle is restricted or prevented when the automatic unlocking function is activated, and
   wherein the automatic unlocking function is deactivated when using a charging cable owned by the at least one user.

2. The method according to claim 1, wherein the automatic unlocking function remains deactivated if the ascertained position of the electric vehicle is at the public charging column.

3. The method according to claim 1, wherein the ascertained position of the electric vehicle is further determined via GPS.

4. The method according to claim 1, wherein the automatic unlocking function activates only when released by a user.

5. The method according to claim 4, wherein the user releases the automatic unlocking function via a vehicle-side user interface or by a user interface of a smartphone.

6. The method according to claim 1, wherein the ascertained position of the electric vehicle is further determined via a WLAN connection.

7. The method according to claim 1, wherein the ascertained position of the electric vehicle is further determined via a mobile wireless network connection.

8. The method according to claim 1, wherein the historical analysis further comprises evaluating an electronic calendar of the at least one user.

9. The method according to claim 8, wherein the electronic calendar comprises appointments during which the electric vehicle has been parked.

10. The method according to claim 1, wherein the operation of the remotely-actuatable and/or timer-based stationary climate control is restricted to drain a battery of the electric vehicle by only a predetermined amount.

11. A control device for an electric vehicle, which is configured to activate an automatic unlocking function for a vehicle-side charging interface based on an ascertained position of the electric vehicle if the electric vehicle is arranged at a public charging column,
   wherein the activated automatic unlocking function effectuates automatic unlocking of the charging interface as soon as a charging procedure of the electric vehicle is ended and thus a charging cable connected to the vehicle-side charging interface is released,
   wherein the ascertained position of the electric vehicle is estimated based on a historical analysis, the historical analysis comprising a past driving behavior and/or a driving history of at least one user of the electric vehicle,
   wherein an operation of a remotely-actuatable and/or timer-based stationary climate control of the electric vehicle is restricted or prevented when the automatic unlocking function is activated, and
   wherein the automatic unlocking function is deactivated when using a charging cable owned by the at least one user.

12. The control device according to claim 11, wherein the historical analysis further comprises evaluating an electronic calendar of the user.

13. The control device according to claim 12, wherein the electronic calendar comprises appointments during which the electric vehicle has been parked.

14. The control device according to claim 11, wherein the operation of the remotely-actuatable and/or timer-based stationary climate control is restricted to drain a battery of the electric vehicle by only a predetermined amount.

* * * * *